(12) United States Patent
Gowreesunker et al.

(10) Patent No.: US 10,066,970 B2
(45) Date of Patent: Sep. 4, 2018

(54) DYNAMIC RANGE CONTROL FOR OPTICAL ENCODERS

(71) Applicant: Apple Inc., Cupertino, CA (US)

(72) Inventors: Baboo V. Gowreesunker, Cupertino, CA (US); Wayne C. Westerman, Cupertino, CA (US); Prashanth S. Holenarsipur, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 265 days.

(21) Appl. No.: 14/796,915

(22) Filed: Jul. 10, 2015

(65) Prior Publication Data

US 2016/0061636 A1 Mar. 3, 2016

Related U.S. Application Data

(60) Provisional application No. 62/042,743, filed on Aug. 27, 2014.

(51) Int. Cl.
*H01J 40/14* (2006.01)
*G01D 5/347* (2006.01)

(52) U.S. Cl.
CPC ....... *G01D 5/3473* (2013.01); *G01D 5/34715* (2013.01)

(58) Field of Classification Search
CPC ... G01D 5/347; G01D 5/3473; G01D 5/34707
USPC .............................. 250/205, 231.13, 231.14
See application file for complete search history.

(56) References Cited

U.S. PATENT DOCUMENTS

| | | |
|---|---|---|
| 3,056,030 A | 9/1962 | Kelchner |
| 4,133,404 A | 1/1979 | Griffin |
| 4,289,400 A | 9/1981 | Kubola et al. |
| 4,311,990 A | 1/1982 | Burke |
| 4,417,824 A | 11/1983 | Paterson et al. |
| 4,593,194 A * | 6/1986 | Graham .................. G01D 5/26 250/205 |
| 4,617,461 A | 10/1986 | Subbarao et al. |
| 4,641,026 A | 2/1987 | Garcia, Jr. |
| 4,670,737 A | 6/1987 | Rilling |
| 4,884,073 A | 11/1989 | Souloumiac |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,034,602 A | 7/1991 | Garcia et al. |
| 5,214,278 A | 5/1993 | Banda |
| 5,288,993 A | 2/1994 | Bidiville et al. |
| 5,471,054 A | 11/1995 | Watanabe |
| 5,572,314 A | 11/1996 | Hyman et al. |
| 5,748,111 A | 5/1998 | Bates |
| 5,841,050 A | 11/1998 | Clift et al. |
| 5,847,335 A | 12/1998 | Sugahara et al. |
| 5,943,233 A | 8/1999 | Ebina |

(Continued)

OTHER PUBLICATIONS

U.S. Appl. No. 13/796,502, filed Mar. 12, 2013, Leung et al.

(Continued)

*Primary Examiner* — Kevin Pyo
(74) *Attorney, Agent, or Firm* — Brownstein Hyatt Farber Schreck, LLP

(57) ABSTRACT

Embodiments of the present disclosure provide a method and system for dynamically controlling a current that is applied to a light source of an optical encoder.

20 Claims, 6 Drawing Sheets

(56) References Cited

U.S. PATENT DOCUMENTS

| | | | |
|---|---|---|---|
| 5,963,332 A | 10/1999 | Feldman et al. | |
| 6,175,679 B1 | 1/2001 | Veligdan et al. | |
| 6,246,050 B1 | 6/2001 | Tullis et al. | |
| 6,809,275 B1 | 10/2004 | Cheng et al. | |
| 6,985,107 B2 | 1/2006 | Anson | |
| 7,102,626 B2 | 9/2006 | Denny, III | |
| 7,135,673 B2 | 11/2006 | Saint Clair | |
| 7,265,336 B2 | 9/2007 | Hataguchi et al. | |
| 7,345,513 B2 * | 3/2008 | Gropper | G11B 7/126 250/205 |
| 7,528,824 B2 | 5/2009 | Kong | |
| 7,761,246 B2 | 7/2010 | Matsui | |
| 7,781,726 B2 | 8/2010 | Matsui et al. | |
| 7,865,324 B2 | 1/2011 | Lindberg | |
| 7,999,199 B2 | 8/2011 | Villain | |
| 8,138,488 B2 | 3/2012 | Grot | |
| 8,368,677 B2 | 2/2013 | Yamamoto | |
| 8,373,661 B2 | 2/2013 | Lan et al. | |
| 8,441,450 B2 | 5/2013 | Degner et al. | |
| 8,477,118 B2 | 7/2013 | Lan et al. | |
| 8,487,237 B2 | 7/2013 | Watanabe | |
| 8,525,777 B2 | 9/2013 | Stavely et al. | |
| 8,593,598 B2 | 11/2013 | Chen et al. | |
| 8,666,682 B2 | 3/2014 | LaVigne et al. | |
| 8,704,787 B2 | 4/2014 | Yamamoto | |
| 8,711,093 B2 | 4/2014 | Ong et al. | |
| 8,730,167 B2 | 5/2014 | Ming et al. | |
| 8,743,088 B2 | 6/2014 | Watanabe | |
| 8,859,971 B2 | 10/2014 | Weber | |
| 8,890,045 B2 * | 11/2014 | Toh | H05B 33/0851 250/205 |
| 8,895,911 B2 | 11/2014 | Takahashi | |
| 8,922,399 B2 | 12/2014 | Bajaj et al. | |
| 8,994,694 B2 | 3/2015 | Lee et al. | |
| 9,041,663 B2 | 5/2015 | Westerman | |
| 9,086,738 B2 | 7/2015 | Leung et al. | |
| 9,134,145 B2 | 9/2015 | Shimizu | |
| 9,285,926 B2 | 3/2016 | Yang et al. | |
| 9,797,752 B1 | 10/2017 | Ruh et al. | |
| 9,797,753 B1 | 10/2017 | Gowreesunker et al. | |
| 2005/0075558 A1 | 4/2005 | Vecerina et al. | |
| 2006/0250377 A1 | 11/2006 | Zadesky et al. | |
| 2007/0146348 A1 | 6/2007 | Villain | |
| 2007/0222756 A1 | 9/2007 | Wu et al. | |
| 2008/0130914 A1 | 6/2008 | Cho | |
| 2008/0278445 A1 | 11/2008 | Sweetser et al. | |
| 2009/0073119 A1 | 3/2009 | Le et al. | |
| 2009/0152452 A1 | 6/2009 | Lee et al. | |
| 2010/0149099 A1 | 6/2010 | Elias | |
| 2012/0113044 A1 | 5/2012 | Strazisar et al. | |
| 2014/0071050 A1 | 3/2014 | Armstrong-Muntner | |
| 2014/0132516 A1 | 5/2014 | Tsai et al. | |
| 2014/0268150 A1 | 9/2014 | Leung et al. | |
| 2014/0327630 A1 | 11/2014 | Burr et al. | |
| 2015/0051671 A1 * | 2/2015 | Browne | A61N 5/0616 607/90 |
| 2016/0306437 A1 | 10/2016 | Zhang et al. | |
| 2017/0115757 A1 | 4/2017 | Armstrong-Muntner | |

OTHER PUBLICATIONS

U.S. Appl. No. 14/062,101, filed Sep. 13, 2013, Armstrong-Muntner.
U.S. Appl. No. 14/333,416, filed Jul. 16, 2014, Rothkopf et al.
U.S. Appl. No. 14/333,418, filed Jul. 16, 2014, Rothkopf et al.
U.S. Appl. No. 14/601,153, filed Jan. 20, 2015, Gowreesunker et al.
U.S. Appl. No. 14/687,743, filed Apr. 15, 2015, Zhang et al.
U.S. Appl. No. 61/645,033, filed May 9, 2012, 84 pages.
DeskThorityNet, Optical Switch Keyboards, http://deskthority.net/keyboards-f2/optical-switch-keyboards-t1474.html, 22 pages.
Epstein et al., "Economical, High-Performance Optical Encoders," Hewlett-Packard Journal Oct. 1988, pp. 99-106 [text only version].
Epstein et al., "Economical, High-Performance Optical Encoders," Hewlett-Packard Journal Oct. 1988, pp. 99-106.
Krishnan et al., "A Miniature Surface Mount Reflective Optical Shaft Encoder," Hewlett-Packard Journal, Dec. 1996, Article 8, pp. 1-6.
DeskThorityNet, Optical Switch Keyboards, http://deskthority.net/keyboards-f2/optical-switch-keyboards-t1474.html, Jul. 11, 2015, 22 pages.

* cited by examiner

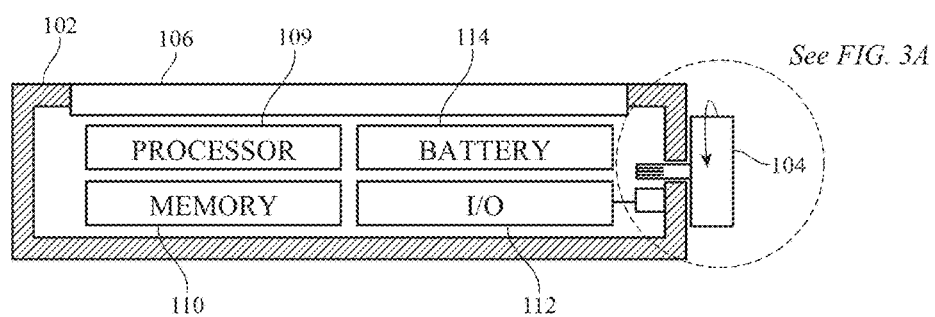
FIG. 2
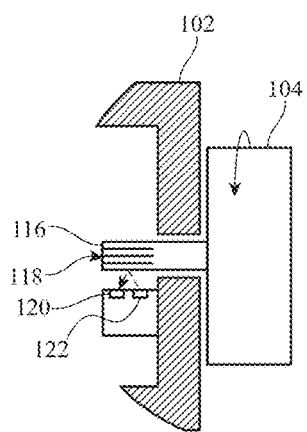 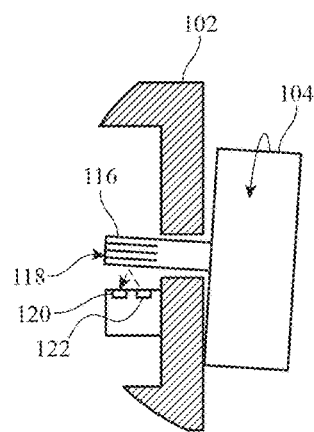 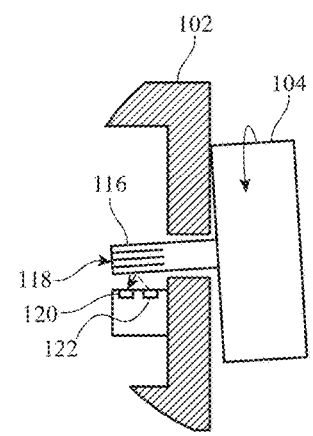
FIG. 3A  FIG. 3B  FIG. 3C

DYNAMIC RANGE CONTROL FOR OPTICAL ENCODERS

CROSS-REFERENCE TO RELATED APPLICATION

This application is a nonprovisional patent application of and claims the benefit to U.S. Provisional Patent Application No. 62/042,743, filed Aug. 27, 2014 and titled "Dynamic Range Control for Optical Encoders," the disclosure of which is hereby incorporated by reference in its entirety.

FIELD

The present disclosure is directed to optical encoders for electronic devices. More specifically, the present disclosure is directed to dynamically adjusting a current that is applied to a light source of the optical encoder in order to determine rotational and/or axial movement of the optical encoder.

BACKGROUND

Many devices, including mechanical, electronic and computerized devices, may utilize various types of encoders for obtaining and collecting data about that device. For example, an optical encoder may consist of a light source that shines light onto a wheel which then reflects the light onto a sensor. Using this information, the rotation of the wheel may be determined.

In conventional optical encoders, the light source emits light at a fixed intensity. However, this approach limits the accuracy of the optical encoder. For example, if the light intensity is too high, the sensor may be saturated and phase information associated with the wheel may be lost. Likewise, if the signal is too low, the sensor may not have enough data to properly determine the position of the optical encoder.

It is with respect to these and other general considerations that embodiments have been made. Although relatively specific problems have been discussed, it should be understood that the embodiments should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of the present disclosure provide a method for dynamically adjusting a current that is applied to a light source of an optical encoder. As will be described, the current, and therefore the output of the light source, may be adjusted to account for a number of factors including, but not limited to, the optical quality of the wheel or shaft of the optical encoder, the speed of rotation of the optical encoder, the operating temperature of, or ambient temperature associated with, an electronic device, the geometrical position or alignment of the wheel of the optical encoder with respect to the light source and the sensor, and an amount of light emitted by the light source.

To dynamically adjust an output of a light source of the optical encoder, a first output current from a first photodiode of a plurality of photodiodes is received. The first output current is associated with a first input current that was applied to the light source at a first time period. A second output current from a second photodiode of the plurality of photodiodes is also received. The second output current is also associated with the first input current that was applied to the light source at the first time period. Once the currents have been received, the first output current is compared to the second output current to obtain a dynamic current value. The dynamic current value is then compared to a target current value in order to estimate an input current for the light source. The input current may then be applied to the light source at a second time period.

In another embodiment, an optical encoder for an electronic device is described. The optical encoder includes a light source, a plurality of photodiodes, a shaft having an encoding pattern and a dynamic range module. In certain embodiments, the dynamic range module is configured to receive a first output current from a first photodiode of the plurality of photodiodes and receive a second output current from a second photodiode of the plurality of photodiodes. The dynamic range module may then compare the first output current to the second output current to obtain a dynamic current value. The dynamic current value is compared to a target value in order to estimate an input current that is to be applied to the light source to dynamically adjust an intensity of the light source at a second time period.

BRIEF DESCRIPTION OF THE DRAWINGS

The disclosure will be readily understood by the following detailed description in conjunction with the accompanying drawings, wherein like reference numerals designate like structural elements, and in which:

FIG. 2 illustrates a cross-section view of the electronic device of FIG. 1 taken along point 2-2 according to one or more embodiments of the present disclosure;

FIG. 3A illustrates an example optical encoder according to one or more embodiments of the present disclosure;

FIG. 3B and FIG. 3C illustrate an example optical encoder having varying alignments with respect to various components of an optical encoder according to one or more embodiments of the present disclosure;

DETAILED DESCRIPTION

Various embodiments are described more fully below with reference to the accompanying drawings, which form a part hereof, and which show specific example embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. The following detailed description is, therefore, not to be taken in a limiting sense.

In various electronic devices, rotational and/or axial movement of a component (e.g., a crown) of the electronic device may need to be determined. In such instances, an optical encoder may be used to detect the rotational movement and the axial movement of the component. For example, the optical encoder of the present disclosure includes a light source that shines on a wheel or a shaft of the optical encoder. The wheel may include an encoding pattern, such as, for example, a collection of light and dark lines that are arranged in a particular sequence or in a particular pattern.

When the light from the light source hits the encoding pattern, the encoding pattern modulates the light and reflects it onto one or more sensors associated with the optical encoder. The sensors process the reflected light and a determination may be made as to the direction, speed and movement (rotational and/or axial) of the wheel. In certain embodiments, the one or more sensors may be an array of photodiodes.

In some cases, the accuracy of the optical encoder may be affected by a number of factors. For example, the sensors of the optical encoder may need to receive a minimum amount of light such that readings are above a minimum signal-to-noise threshold. In addition, the sensor should not receive too much light or an analog-to-digital converter associated with the sensors may become saturated which could lead to lost signals.

As such, embodiments of the present disclosure describe a system and method for dynamically adjusting a current that is applied to a light source of an optical encoder. For example, one or more embodiments described herein are directed to a dynamic range control module that adjusts the amount of current that is applied to the light source while still maintaining a minimum signal-to-noise ratio and also falling below a maximum voltage threshold. In such embodiments, the current that is applied to the light source may dynamically increase when the current is too low and dynamically decrease when the current is too high (so as to avoid saturation of the photodiodes).

Figure 1:
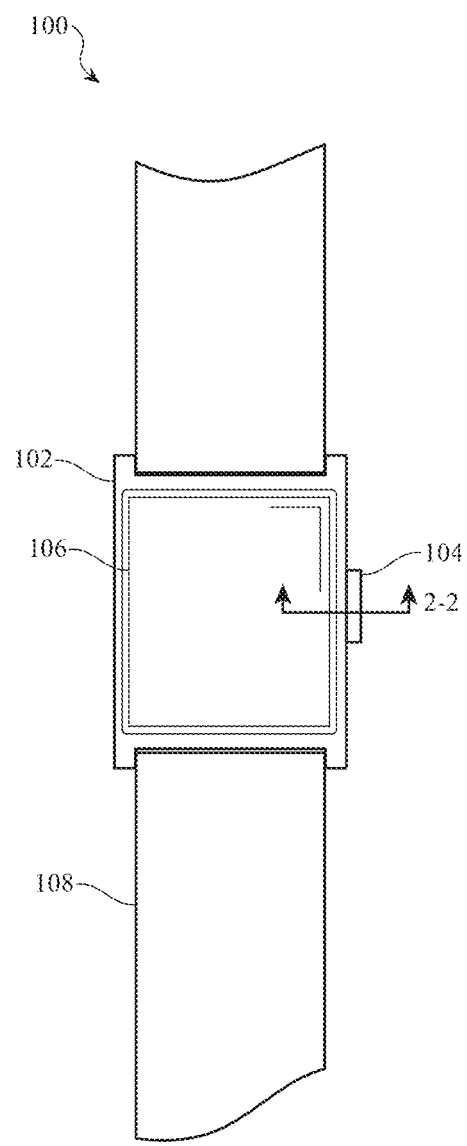
FIG. 1 illustrates an example electronic device according to one or more embodiments of the present disclosure.

FIG. 1 illustrates an example electronic device 100 according to one or more embodiments of the present disclosure. The electronic device 100 may be a portable computing device. Examples of portable computing devices include cell phones, smart phones, tablet computers, laptop computers, time-keeping devices, computerized glasses and other wearable devices navigation devices, sports devices, accessory devices, health-monitoring devices, medical devices and the like. In one example and as shown in FIG. 1, the electronic device 100 may be a wearable electronic device. The electronic device 100 may include a housing 102 as well as a display 106, and a crown 104. Although specific components are shown and mentioned, the electronic device 100 may contain other components such as shown below with respect to FIG. 7 as well as other input mechanisms such as buttons, switches and so on.

The display 106 of the electronic device 100 may be a touch-sensitive display having an input area. The input area may cover the entire display 106 or substantially all of the display 106. In another embodiment, the input area may cover only a portion of the display 106. The display 106 may be configured to output a user interface that displays information about the electronic device 100 as well as other information that is stored in a memory of the electronic device 100. For example, the user interface may present information corresponding to one or more applications that are being executed on the electronic device 100. Such applications may include a time keeping application, an email application, a phone application, a calendaring application, a game application, a health monitoring application and so on.

In certain embodiments, an input mechanism, such as, for example, the crown 104, may be used to select, adjust or change various images that are output on the display 106. For example, if the display 106 of the electronic device 100 is displaying a time keeping application, the crown 104 may be rotated in either a clockwise or counterclockwise direction to change or adjust the position of the hands or the digits that are displayed for the time keeping application. In other embodiments, the crown 104 may be rotated to move a cursor or other type of selection mechanism from a first displayed location to a second displayed location in order to select an icon or move the selection mechanism between various icons that are output on the display 106. Likewise, the crown 104 may be pushed or pressed in a linear direction to provide another input to the electronic device 100.

As shown in FIG. 1, the electronic device 100 may also include a band 108 that is used to secure or attach the electronic device 100 to a user. Other attachment mechanisms, such as, for example, a strap, a lanyard or other such attachment mechanism may also be used.

FIG. 2 illustrates a cross-section view of the electronic device 100 of FIG. 1 taken alone line 2-2 according to one or more embodiments of the present disclosure. As shown in FIG. 2, the electronic device 100 may include various components that assist in the overall operation of the electronic device 100. For example, the electronic device 100 may include a processor 109, a memory 110, a battery 114 and various input and output components 112. In certain embodiments, the input and output components 112 may include a sensor, a microphone, a camera, speakers, dials, buttons and so on.

The electronic device 100 may include one or more components that enable the electronic device 100 to connect to the Internet and/or access one or more remote databases or storage devices. The electronic device 100 may also enable communication over wireless media such as acoustic, radio frequency (RF), infrared, and other wireless media mediums. Such communication channels may enable the electronic device 100 to remotely connect and communicate with one or more additional devices such as, for example, a laptop computer, a tablet computer, a mobile telephone, a personal digital assistant, a portable music player, speakers and/or headphones and so on.

The electronic device 100 may also include one or more communication interfaces. The communication interfaces can provide electronic communications between the electronic device 100 and any external communication network, device or platform, such as but not limited to wireless interfaces, Bluetooth interfaces, Near Field Communication interfaces, infrared interfaces, USB interfaces, Wi-Fi interfaces, TCP/IP interfaces, network communications interfaces, or any conventional communication interfaces. The electronic device 100 may provide information regarding time, health, statuses or externally connected or communicating devices and/or software executing on such devices, messages, video, operating commands, and so forth (and may receive any of the foregoing from an external device), in addition to the electronic communications.

As also shown in FIG. 2, and in further detail in FIG. 3A, the electronic device 100 includes an optical encoder. More specifically, FIG. 3A illustrates an example optical encoder of an electronic device, such as, for example, electronic device 100 discussed above. As shown in FIG. 3A, the optical encoder of the present disclosure may include a shaft 116, a light source 122 and a photodiode array 120. Although a photodiode array 120 is specifically mentioned, embodiments disclosed herein may use various types of sensors that are arranged in any number of configurations for detecting the movement of the shaft 116. For example, the movement of the shaft 116 may be detected by an image sensor, a light sensor such as a CMOS light sensor or imager, a photovoltaic cell or system, a photo resistive component, a laser scanner and the like.

The light source 122 of the electronic device 100 may be any type of emitter that provides light in response to a received current. In addition, the light from the light source should be a type that can be reflected off of the shaft 116, or an encoding pattern 118 on the shaft 116, and be subsequently received by the photodiode array 120. For example, the light source 122 may be an LED, an infrared light such as, for example an infrared LED, a laser diode, a light bulb and any other such light source.

In certain embodiments, the shaft 116 of the optical encoder may be coupled to the crown 104. In another embodiment, the shaft 116 may be an extension of the crown 104. That is, the crown 104 and the shaft 116 may be manufactured from a single, unitary piece. As the shaft 116 is coupled to, or is otherwise a part of the crown 104, as the crown 104 rotates or moves in a particular direction and at a particular speed, the shaft 116 also rotates or moves in the same direction and with the same speed.

In some cases, the shaft 116 of the optical encoder includes an encoding pattern 118. The encoding pattern 118 may be used to determine positional information about the shaft 116 including rotational movement, angular displacement and movement speed. In certain embodiments, the encoding pattern 118 may include a plurality of light and dark stripes arranged axially along the shaft 116.

Although light stripes and dark stripes are specifically mentioned, the encoding pattern 118 may consist of various types of stripes having various shades or colors that provide surface contrasts. For example, the encoding pattern 118 may include a stripe or marking that has a high reflective surface and another stripe that has a low reflective surface regardless of the color or shading of the stripes or markings. In another embodiment, a first stripe of the encoding pattern 118 may cause specular reflection while a second stripe of the encoding pattern 118 may cause diffuse reflection. When the reflected light is received by the photodiode array, a determination may be made as to the position and movement of the shaft 116. In embodiments where a holographic or diffractive pattern is used, the light from the light source will diffract from the shaft. Based on the diffracted light, the photodiode array may determine the position, movement and direction of movement of the shaft.

In some embodiments, the stripes of the encoding pattern 118 extend axially along the shaft 116. The stripes may extend along the entire length of the shaft 116 or partially along a length of the shaft 116. In addition, the encoding pattern 118 may also be disposed around the entire circumference of the shaft 116. In other embodiments, the encoding pattern 118 may include a radial component. In yet other embodiments, the encoding pattern may have both a radial component and an axial component.

As discussed above, the optical encoder may be used to determine positional data of the crown 104. More specifically, the optical encoder may be used to detect movement of the crown 104 including the direction of the movement, speed of the movement and so on. Once the movement data of the crown 104 is determined, one or more graphics, images or icons on the display 106 of the electronic device 100 may be updated or altered accordingly.

For example, continuing with the time keeping application example discussed above, the crown 104 may be rotated in a clockwise manner in order to change the displayed time. The optical encoder of the present disclosure will detect the original starting position of the crown 104, the rotational movement of the crown 104 in the clockwise direction, and will also detect the speed at which the crown 104 is being rotated. As a result, the displayed hands of the time keeping application may rotate or otherwise move in a similar direction and speed.

However, as discussed above, if the photodiodes of the optical encoder do not receive a minimum amount of light, a signal-to-noise ratio of the optical encoder may be too low to accurately detect the rotation and/or a position of the crown 104. Likewise, if the photodiode array 120 received too much light from the light source 122, the photodiode array 120 may become saturated. Saturation of the photodiode array 120, and more specifically an analog-to digital converter associated with photodiode array 120, may cause the optical encoder to inaccurately detect rotation of the crown 104.

Another factor that may affect the amount of light received by the photodiode array 120 is the optical quality of the shaft 116. For example, when the shaft 116 is manufactured, various patterns may be present of the shaft 116. These patterns may include striations, bumps, scallops, grooves, channels and so on. In some embodiments, these patterns may run vertically along the shaft 116. In other embodiments, these patterns may run around a circumference of the shaft 116 and/or be offset from each other along a length of the shaft 116. In other cases, the surface of the shaft 116 may not be entirely or completely rounded or smooth.

Due to these various imperfections, the reflective qualities of the shaft may vary as the shaft 116 rotates. As the reflective qualities change, the amount of light that is reflected off of the shaft 116 also changes. As a result, the signals received by the photodiode array 120 may also fluctuate. As discussed, fluctuation of the amount of light over a given time period may cause inaccuracies in determining the rotation of the shaft 116.

In yet other cases, the alignment of the shaft 116 with respect to the light source 122 and the photodiode array 120 may also vary. For example, as shown in FIG. 3B, the alignment of the shaft 116 may be positioned at an angle with respect to the light source 122 and the photodiode array 120. Because the shaft 116 is positioned at an angle with respect to these components of the optical encoder, the distance between the shaft 116 and these components may also vary as the shaft 116 rotates. As a result, the amount of light received by the photodiode array 120 also varies accordingly which may affect the accuracy of the optical encoder.

For example, a first amount of light may be received by the photodiode array 120 when the shaft 116 is in a first position such as shown in FIG. 3B. Likewise, a second, greater amount of light may be received by the photodiode array 120 when the shaft 116 has been rotated to a second position such as shown in FIG. 3C. Because less light may be received by the photodiode array 120 when the shaft 116 is at the first position, a minimum signal-to-noise ratio may not be able to be maintained and thus signal may be lost. Likewise, because more light may be received by the photodiode array 120 when the shaft is the second position, the photodiode array 120 may become saturated. Saturation of the photodiode array 120, and more specifically, an analog-to-digital converter associated with the photodiode array 120, may cause various signals of the optical encoder to be lost or corrupted.

Figure 4:
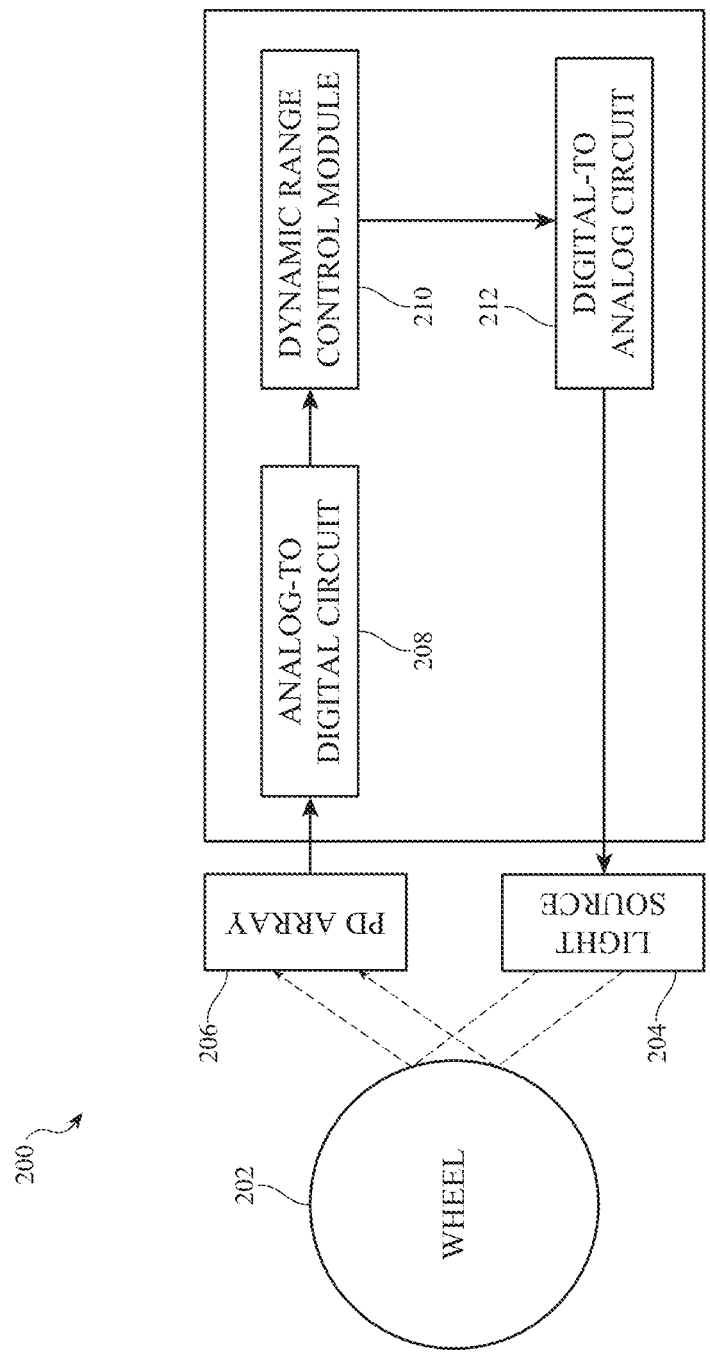
FIG. 4 illustrates a block diagram illustrating various components of an optical encoder that may be used to dynamically adjust a current that is applied to a light source of an optical encoder according to one or more embodiments of the present disclosure.

FIG. 4 illustrates a block diagram of various components of an optical encoder 200 that may be used to dynamically adjust a current that is applied to a light source of an optical encoder according to one or more embodiments of the present disclosure. The optical encoder 200 shown and described with respect to FIG. 4, and the various components of the optical encoder 200, may be similar to, or used in conjunction with, the optical encoder described above with respect to FIGS. 1-3C.

In certain embodiments, the optical encoder 200 may have a target dynamic range (in volts) in which it operates. The target dynamic range may be determined by a calibration process that is executed on the optical encoder 200.

The optical encoder 200 includes a wheel 202, a light source 204 and a photodiode array 206. In certain embodiments, the wheel 202 may be similar to the shaft 116 described above. Likewise, the photodiode array 206 and the light source 204 may be similar to photodiode array 120 and light source 122 also described above.

The light source 204 shines light onto the wheel 202. The wheel 202 (or an encoding pattern on the wheel 202) reflects the light into a photodiode array 206. As the light from the light source 204 is reflected off of the wheel 202, each photodiode of the photodiode array 206 may receive a voltage measurement associated with an amount of light received at a given sample time.

Once the light is received by the photodiode array 206 at a given time period, an analog-to-digital circuit 208 is used to convert the analog signal received from the photodiode array 206 to a digital signal. The digital signal may then be used to determine a rotation or other movement of the wheel 202, the speed of the movement of the wheel 202 and so on.

The digital signal from the analog-to-digital circuit 208 may also be passed to a dynamic range control module 210. In certain embodiments, the dynamic range control module 210 is used to determine or estimate an amount of current that should subsequently be applied to the light source 204. More specifically, the dynamic range control module 210 is configured to calculate a dynamic range associated with the optical encoder, compare the calculated dynamic range to a target dynamic range, and adjust a current that is applied to the light source based on the comparison. As a result, a determination may be made as to whether the current that is subsequently supplied to the light source 204 should increase, decrease or be maintained.

Figure 5A:
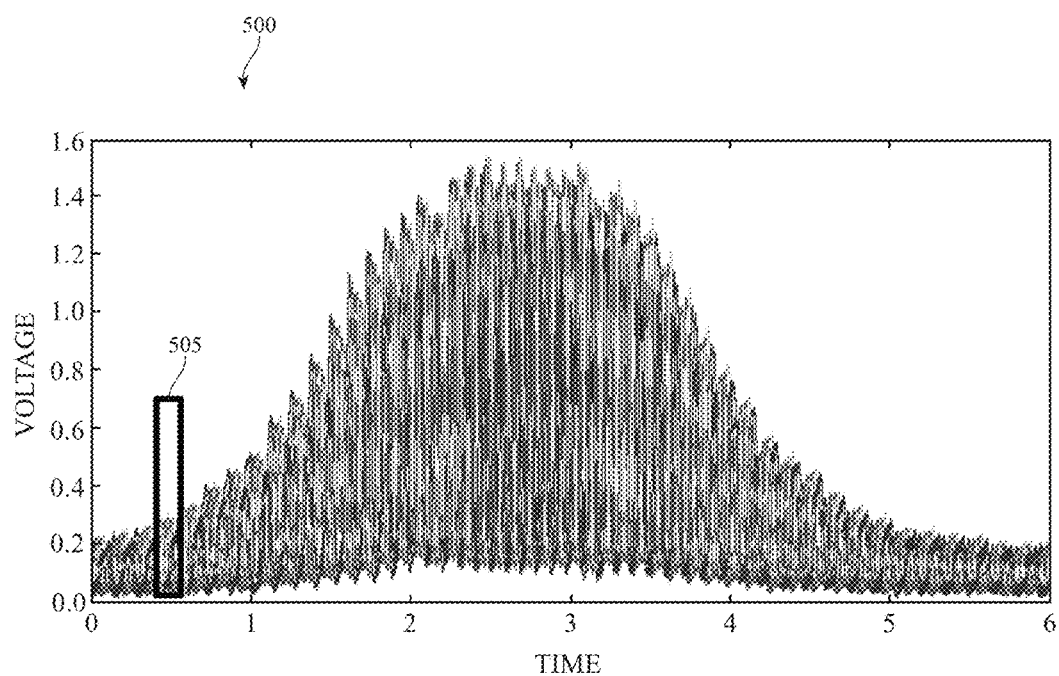
FIG. 5A and FIG. 5B illustrate example voltage readings of a sensor array over a given time period according to one or more embodiments of the present disclosure.

To determine the dynamic range value, the dynamic range control module 210 receives a snapshot of voltage readings of all photodiodes in the photodiode array 206 taken at a sample time. For example, and referring to FIG. 5A (which illustrates a graph 500 showing example voltage amounts that may be received by each photodiode in the photodiode array 206 superimposed over each other for a given time period), the dynamic range control module 210 may take a sample frame of voltages that were received by each photodiode at a particular time. The sample frame is shown in the box 505. Using the information in the sample frame, the dynamic range control module 210 may calculate the dynamic range. Although the sample frame is shown at a particular time in graph 500, the sample frame that is used to determine the dynamic range may be taken at any time.

Figure 5B:
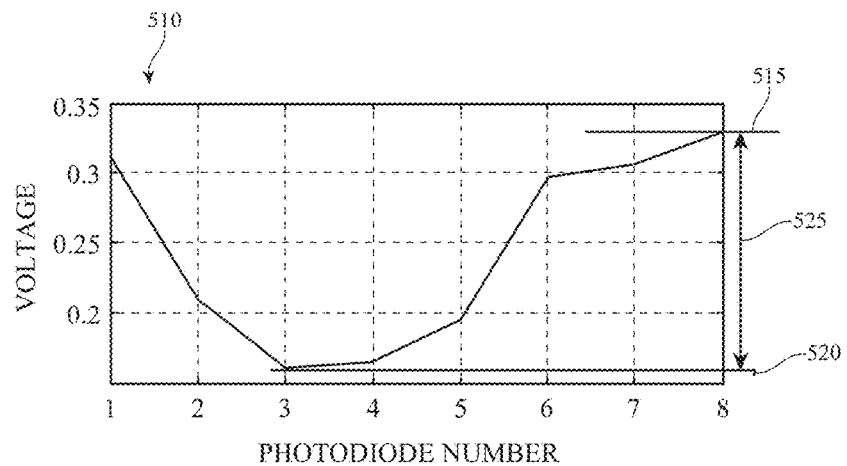

In certain embodiments, the dynamic range is the mean of a maximum voltage from the sample frame at a given sample time and a minimum voltage from the sample frame at the particular sample time. Referring to FIG. 5B, FIG. 5B illustrates a graph 510 of voltage readings taken by each photodiode (e.g., photodiode 1-8) in the photodiode array at a sample time represented by box 505 of FIG. 5A. As shown in FIG. 5B, each of the photodiodes in the photodiode array may have received different voltage samples at this particular sample time. For example, photodiode 1 had a reading of approximately 0.3 volts and photodiode 2 had a voltage reading of approximately 0.2 volts at the same sample time.

As also shown in FIG. 5B, one photodiode may have the highest voltage reading 515 while another photodiode may have the lowest voltage reading 520. Using this information, a dynamic range 525 may be calculated by finding the difference between the highest voltage reading 515 and the lowest voltage reading 520. Once the dynamic range 525 is calculated, the dynamic range 525 may be used to estimate a voltage that should be subsequently applied to the light source 204 such as will be described below. In other embodiments, the dynamic range 525 may be calculated by receiving previously determined dynamic range values (e.g., the mean between a maximum received voltage and a minimum received voltage) at various sample times, comparing those dynamic range values to a current dynamic range value, and determining a moving average of the samples.

Referring back to FIG. 4, once the dynamic range is determined, the dynamic range control module 210 determines a gain setting that is to be applied to the light source 204 at a second time period. In some embodiments, the gain that is to be applied to the light source is a determination of a difference between the calculated dynamic range and the target dynamic range. For example, if the target dynamic range is 0.5 volts and the calculated dynamic range is 1.0 volts, the current that is applied to the light source 204 using the digital-to-analog circuit 212 is reduced by 0.5 volts.

In another embodiment, a stair-step approach may be taken to calculate the gain. For example, instead of reducing the gain by 0.5 volts such as described above, the gain may be reduced by a percentage of the difference between the calculated dynamic range and the target dynamic range. In other embodiments, the gain that is to be applied to the light source at a second time period may be calculated by determining the target dynamic range, dividing the target dynamic range by the calculated dynamic range for a current time, and multiplying that value by a previously calculated gain (e.g., the gain that was calculated at the time period just previous to the current time sample).

Figure 6:
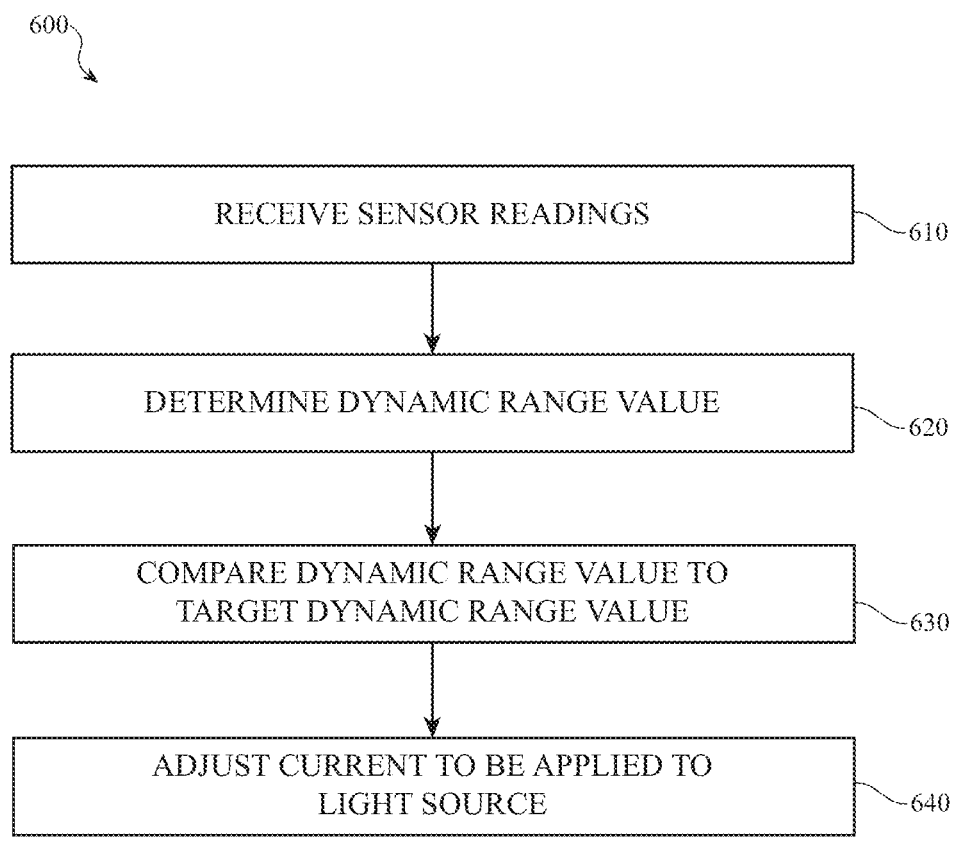
FIG. 6 illustrates a method for dynamically adjusting a current that is applied to a light source of an optical encoder according to one or more embodiments of the present disclosure.

FIG. 6 illustrates a method 600 for dynamically adjusting a current that is applied to a light source of an optical encoder according to one or more embodiments of the present disclosure. In certain embodiments, the method 600 may be used to dynamically adjust the current of a light source of an optical encoder, such as, for example, the optical encoder discussed above with respect to FIGS. 1-4.

Method 600 begins when sensor readings are received 610. In certain embodiments, the sensor readings are received at a first time period and correspond to the amount of light that is received by the sensors at that time period. For example, the sensors may be a photodiode array configured to capture light that has been reflected off of a wheel of an optical encoder. From this reflected light, the optical encoder may determine directional movement and speed of the encoder wheel.

Once the sensor readings are received, flow proceeds to operation 620 in which a dynamic range of the received light is calculated. More specifically, the optical encoder is configured to sample each sensor at a particular time (e.g., a sample time) to obtain voltage readings from each sensor at the sample time. Once this information is received, the mean of the maximum voltage and the minimum voltage during that sample time is determined and set to the dynamic range.

Operation 630 provides that the calculated dynamic range is compared with a target dynamic range to obtain a difference that is to be applied to the light source. In some instances, this gain may be a positive gain or a negative gain. More specifically, the comparison between the calculated dynamic range and the target dynamic range is a value that is used to determine an amount of current that is applied to the light source at second time period. In some embodiments and as discussed above, a stair-step approach may be taken to calculate the gain.

When the comparison has been made, the current that is to be applied to the light source at a second time period is adjusted 640. Once the current is adjusted, that current is applied to the light source. In some embodiments, the second time period may be directly after the first time period (e.g., the time period in which the operation 610 was executed).

In certain embodiments, method 600 may proceed only when a received current value is greater than a minimum current threshold and lower than a maximum current threshold. If these conditions are satisfied, the method 600 may proceed as outlined above.

Figure 7:
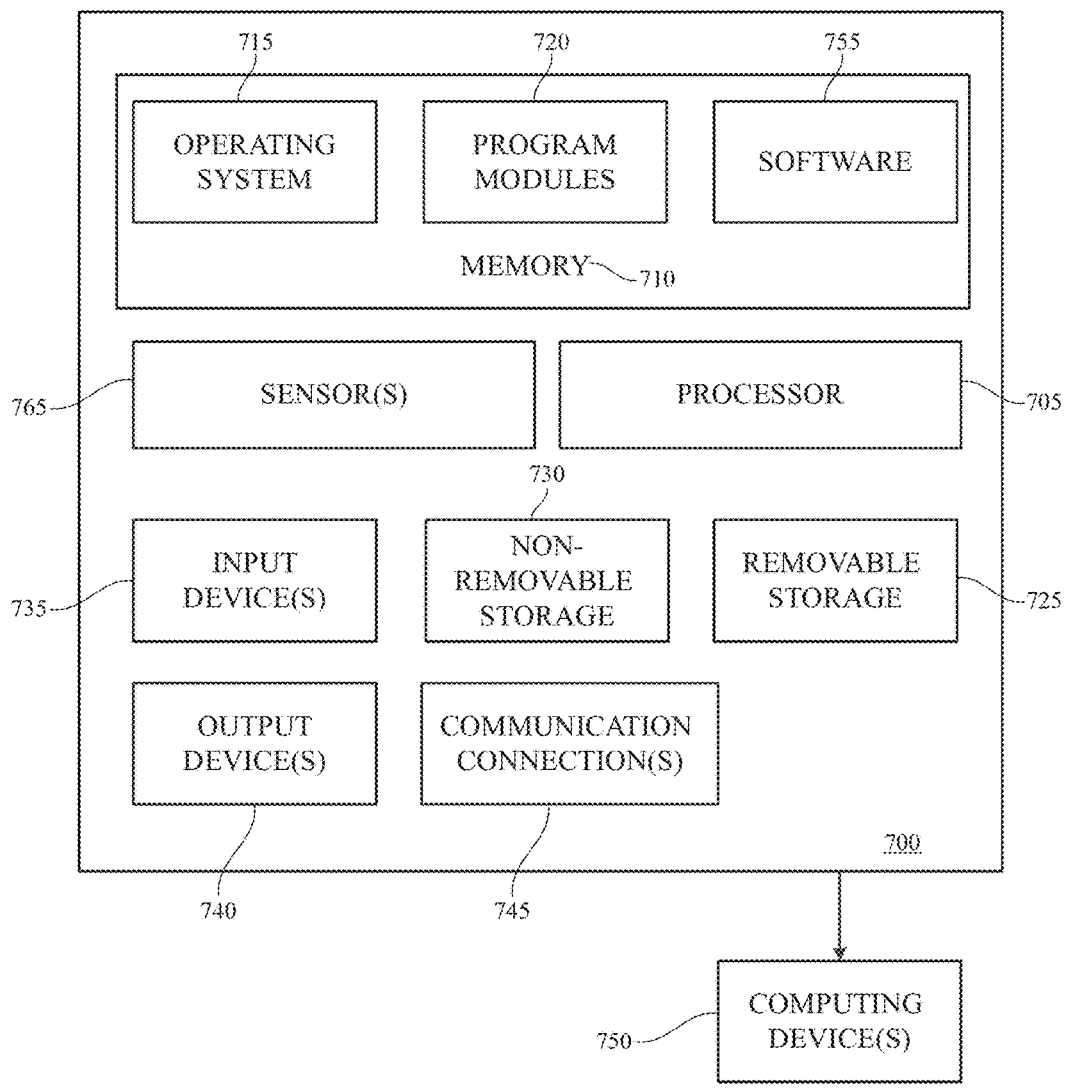
FIG. 7 is a block diagram illustrating example components of an electronic device according to one or more embodiments of the present disclosure.

FIG. 7 is a block diagram illustrating example components, such as, for example, hardware components, of an electronic device 700 according to one or more embodiments of the present disclosure. In certain embodiments, the electronic device 700 may be similar to the electronic device 100 described above. Although various components of the electronic device 700 are shown, connections and communication channels between each of the components are omitted for simplicity.

In a basic configuration, the electronic device 700 may include at least one processor 705 and an associated memory 710. The processor 705 may be used to determine an amount of light being received by a photodiode array and/or control the voltage that is applied to the light source. The memory 710 may comprise, but is not limited to, volatile storage such as random access memory, non-volatile storage such as read-only memory, flash memory, or any combination thereof. The memory 710 may store an operating system 715 and one or more program modules 720 suitable for running software applications 755. The operating system 715 may be configured to control the electronic device 700 and/or one or more software applications 755 being executed by the operating system 715. The software applications 755 may include browser applications, e-mail applications, calendaring applications, contact manager applications, messaging applications, games, media player applications, time keeping applications and the like.

The electronic device 700 may have additional features or functionality than those expressly described herein. For example, the electronic device 700 may also include additional data storage devices, removable and non-removable, such as, for example, magnetic disks, optical disks, or tape. Example storage devices are illustrated in FIG. 7 by removable storage device 725 and a non-removable storage device 730. In certain embodiments, various program modules and data files may be stored in the system memory 710.

As also shown in FIG. 7, the electronic device 700 may include one or more input devices 735. The input devices 735 may include a keyboard, a mouse, a pen or stylus, a sound input device, a touch input device, and the like. The electronic device 700 may also include one or more output devices 740. The output devices 740 may include a display, one or more speakers, a printer, and the like. The electronic device 700 may also include one or more sensors 765. The sensors may include, but are not limited to, accelerometers, ambient light sensors, photodiodes, gyroscopes, magnetometers and so on. These sensors 765 may work in conjunction with the processor 705 to determine an amount of light being emitted by a light source and may also be used to determine movement of a component of the electronic device 700.

The electronic device 700 also includes communication connections 745 that facilitate communications with additional electronic devices 750. Such communication connections 745 may include a RF transmitter, a receiver, and/or transceiver circuitry, universal serial bus (USB) communications, parallel ports and/or serial ports.

As used herein, the term computer-readable media may include computer storage media. Computer storage media may include volatile and nonvolatile media and/or removable and non-removable media implemented in any method or technology for the storage of information. Examples include computer-readable instructions, data structures, or program modules. The memory 710, the removable storage device 725, and the non-removable storage device 730 are all examples of computer storage media. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 700. Any such computer storage media may be part of the electronic device 700. Computer storage media may store instructions which, when executed by the processor 705, dynamically adjust a current applied to a light source.

In certain embodiments, the electronic device 700 includes a power supply such as a battery, a solar cell, and the like that provides power to each of the components shown. The power supply may also include an external power source, such as an AC adapter or other such connector that supplements or recharges the batteries. The electronic device 700 may also include a radio that performs the function of transmitting and receiving radio frequency communications. Additionally, communications received by the radio may be disseminated to the application programs. Likewise, communications from the application programs may be disseminated to the radio as needed.

The electronic device 700 may also include a visual indicator, a keypad and a display. In embodiments, the keypad may be a physical keypad or a virtual keypad generated on a touch screen display. The visual indicator may be used to provide visual notifications to a user of the electronic device. The electronic device 700 may also include an audio interface for producing audible notifications and alerts.

In certain embodiments, the visual indicator is a light emitting diode (LED) or other such light source and the audio interface is a speaker. In other embodiments, the audio interface may be configured to receive audio input.

The audio interface may also be used to provide and receive audible signals from a user of the electronic device 700. For example, a microphone may be used to receive audible input. In accordance with embodiments of the present disclosure, the microphone may also serve as an audio sensor to facilitate control of notifications such as described above. The system may further include a video interface that enables an operation of an on-board camera to record still images, video, and the like.

Embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

The description and illustration of one or more embodiments provided in this disclosure are not intended to limit or restrict the scope of the present disclosure as claimed. The embodiments, examples, and details provided in this disclosure are considered sufficient to convey possession and enable others to make and use the best mode of the claimed embodiments. Additionally, the claimed embodiments should not be construed as being limited to any embodiment, example, or detail provided above. Regardless of whether shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternate embodiments falling within the spirit of the broader aspects of the embodiments described herein that do not depart from the broader scope of the claimed embodiments.

What is claimed is:

1. A method for dynamically adjusting output of a light source of an optical encoder that is operable to detect movement of a watch crown, the method comprising:
    receiving a first output voltage from a first photodiode of a plurality of photodiodes, wherein the first output voltage is associated with a first input current that was applied to the light source at a first time period;
    receiving a second output voltage from a second photodiode of the plurality of photodiodes, wherein the second output voltage is associated with the first input current that was applied to the light source at the first time period;
    comparing the first output voltage to the second output voltage to obtain a dynamic range;
    comparing the dynamic range to a target range to determine whether an alignment of the watch crown with respect to the plurality of photodiodes or the light source is changed; and
    estimating, using the comparison between the dynamic range and the target range, an input current for the light source, the estimated input current offsetting the alignment of the watch crown when the alignment of the watch crown is determined to impact a signal-to-noise ratio of the optical encoder, wherein the estimated input current is applied to the light source at a second time period.

2. The method of claim 1, wherein the estimated input current is configured to change an intensity of the light source.

3. The method of claim 1, wherein the first output voltage and the second output voltage are received at a first sample time.

4. The method of claim 1, wherein comparing the first output voltage to the second output voltage to obtain a dynamic range comprises finding the mean of the first output voltage and the second output voltage.

5. The method of claim 1, wherein at least one of the first output voltage and the second output voltage vary based on the alignment of the watch crown with respect to the light source.

6. The method of claim 1, further comprising determining whether the dynamic range is below a minimum voltage threshold.

7. The method of claim 1, further comprising determining whether the dynamic range is above a maximum voltage threshold.

8. A non-transitory computer-readable storage medium encoding computer executable instructions which, when executed by a processor, perform a method for dynamically adjusting a light source of an optical encoder that is operable to detect movement of a watch crown, the method comprising:
    receiving a first output voltage from a first photodiode of a plurality of photodiodes, wherein the first output voltage is associated with a first input current that was applied to the light source at a first time period;
    receiving a second output voltage from a second photodiode of the plurality of photodiodes, wherein the second output voltage is associated with the first input current that was applied to the light source at the first time period;
    comparing the first output voltage to the second output voltage to obtain a dynamic range;
    comparing the dynamic range to a target range to determine whether an alignment of the watch crown with respect to the plurality of photodiodes or the light source is changed; and
    estimating, using the comparison between the dynamic range and the target range, an input current for the light source, the estimated input current offsetting the alignment of the watch crown when the alignment of the watch crown is determined to impact a signal-to-noise ratio of the optical encoder, wherein the estimated input current is applied to the light source at a second time period.

9. The non-transitory computer-readable storage medium of claim 8, wherein the estimated input current is configured to change an intensity of the light source at the second time period.

10. The non-transitory computer-readable storage medium of claim 8, wherein the first output voltage and the second output voltage are received at a first sample time.

11. The non-transitory computer-readable storage medium of claim 8, wherein comparing the first output voltage to the second output voltage to obtain a dynamic range comprises finding the mean of the first output voltage and the second output voltage.

12. The non-transitory computer-readable storage medium of claim 8, wherein at least one of the first output voltage and the second output voltage vary based on the alignment of the watch crown with respect to the light source.

13. The non-transitory computer-readable storage medium of claim 8, further comprising determining whether the dynamic range is below a minimum voltage threshold.

14. The non-transitory computer-readable storage medium of claim 8, further comprising determining whether the dynamic range is above a maximum voltage threshold.

15. A watch crown, comprising:
   an optical encoder comprising:
      a light source;
      a plurality of photodiodes;
      a shaft having an encoding pattern disposed thereon, wherein the shaft is configured to reflect light from the light source into the plurality of photodiodes; and
      a dynamic range module;
   a cap affixed to the shaft and operative to receive an input, the input changing an alignment of the shaft; wherein the dynamic range module is configured to:
      receive a first output voltage from a first photodiode of the plurality of photodiodes;
      receive a second output voltage from a second photodiode of the plurality of photodiodes;
      compare the first output voltage to the second output voltage to obtain a dynamic range;
      compare the dynamic range to a target range to determine whether the dynamic range exceeds the target range; and
      estimate an input current for the light source, wherein the input current is based, at least in part, on the comparison between the dynamic range and the target range and wherein the input current is applied to the light source to dynamically adjust an intensity of the light source to offset the alignment of the shaft when the alignment of the shaft is determined to impact a signal-to-noise ratio of the optical encoder.

16. The optical encoder of claim 15, wherein the light source is an LED light source.

17. The optical encoder of claim 15, wherein the input current is provided to a digital to analog converter prior to being applied to the light source.

18. The optical encoder of claim 15, further comprising a position sensing module configured to determine a position and a rotation of the shaft.

19. The optical encoder of claim 15, wherein at least one of the first output voltage and the second output voltage vary based on the alignment of the shaft.

20. The optical encoder of claim 15, wherein the dynamic range module is further configured to determine whether the dynamic range is below a minimum voltage threshold or above a maximum voltage threshold.

* * * * *